(12) United States Patent
Gonzalez et al.

(10) Patent No.: US 6,380,454 B1
(45) Date of Patent: Apr. 30, 2002

(54) DESTRUCTION OF POLYCHLORINATED BIPHENYLS

(76) Inventors: Luciano A. Gonzalez, 108 Bonaventure Dr., Hamilton (CA), L9C 4P9; Dennis F. Mullins, 5395Linbrook Rd., Burlington (CA), L7B 3V1; W. John Janis, 268 Windermere Avenue, Toronto, Ontario (CA), M6S 3K5; James S. Ferrie, 4 Rockcastle Dr., Etobicoke, Ontario (CA), M9R 2V1

( * ) Notice: Subject to any disclaimer, the term of this patent is extended or adjusted under 35 U.S.C. 154(b) by 0 days.

(21) Appl. No.: 07/670,001

(22) Filed: Mar. 15, 1991

(51) Int. Cl.$^7$ .................................................. A62D 3/00
(52) U.S. Cl. ....................... 588/207; 588/209; 588/228; 588/248; 423/659; 208/262.5
(58) Field of Search ....................... 423/659; 208/262.5, 208/349; 585/469; 588/207, 228, 209, 248

(56) References Cited

U.S. PATENT DOCUMENTS

| | | | | |
|---|---|---|---|---|
| 4,351,978 A | * | 9/1982 | Hatano et al. | 585/469 |
| 4,379,752 A | * | 4/1983 | Norman | 210/712 |
| 4,465,590 A | * | 8/1984 | Adams | 208/262 |
| 4,592,844 A | * | 6/1986 | Layman et al. | 210/709 |
| 4,639,309 A | * | 1/1987 | Lalancette et al. | 208/262 |
| 4,755,628 A | * | 7/1988 | Adams | 585/469 |

FOREIGN PATENT DOCUMENTS

| | | |
|---|---|---|
| EP | 186291 | 7/1986 |
| EP | 347888 | 12/1989 |
| WO | 85/00826 | 2/1985 |
| WO | 85/02937 | 7/1985 |

OTHER PUBLICATIONS

"Chemical Engineer's Handbook" 5th Ed. by Perry et al., McGraw Hill Book Co. (1973) pp. 6–3.*

* cited by examiner

Primary Examiner—Steven P. Griffin
Assistant Examiner—Timothy C Vanoy
(74) Attorney, Agent, or Firm—Shlesinger, Arkwright & Garvey LLP

(57) ABSTRACT

Chlorobenzenes present in PCBs as viscosity reducing diluents can be largely removed from the PCBs by fractional distillation without carry over of PCBs into the chlorobenzene rich distillate. The PCB rich bottoms can be economically destroyed using a sodium dispersion under conditions of temperature, concentration and stirring which result in autocatalytic reaction. Sodium dispersion can be measured for dispensing into the reaction by accumulation under a pressurized gas space in a measuring vessel of predetermined volume until a predetermined pressure is attained. The pressurized gas is then employed to expel the dispersion from the measuring vessel into the reactor.

22 Claims, 4 Drawing Sheets

DESTRUCTION OF POLYCHLORINATED BIPHENYLS the present invention relates to the destruction of polychlorinated biphenyls (PCBs). Such biphenyls have been used in the past on a large scale in electrical equipment as fire resistant, heat stable dielectric material and as a coolant. However, these compounds have been identified as being environmentally hazardous, and manufacture and sale of them is now prohibited in most countries. Fluids contaminated with more than 2 ppm PCBs may in some jurisdictions be considered to require special handling and may not be disposed of in ordinary disposal sites.

A number of methods are known for removal or destruction of PCBs and like polyhalogenated biphenyls. For example, known methods include absorption in swellable solid polymers, destruction of PBBs (polybrominated biphenyls) in a thermite reaction, reaction with a mixture of polyalkylene glycol alkyl ether and alkali metal hydroxide, extraction into methanol, combustion in a diesel engine or similar combustor, decomposition in molten salts, and dehalogenation employing finely divided molten sodium dispersion.

The latter method, namely dehalogenation with molten sodium dispersion, offers the advantages that it is relatively easily controllable and under carefully maintained conditions can be operated without substantial risk of escape of PCBs or similar materials from the system, has relatively low operating and energy consumption costs, and is capable of substantially complete destruction of the PCBs or similar materials.

The present applicants have, however, determined that known processes of dehalogenation using sodium dispersion consume quantities of sodium that are greater than are desirable, are less energy efficient than are desirable and produce undesirable byproducts which may tend to be emitted from the system unless special precautions are taken. These problems arise because typically insulating fluids based on PCB and similar materials-contain substantial quantities of chlorobenzenes, which are normally added to reduce the viscosity of the mixture. For example askarel, usually a PCB based electrical insulating fluid, usually contains about 30 to about 70% by weight of mixture of different PCBs and the balance a mixture of different di-, tri- and tetrachlorinated benzenes. On reaction with the sodium dispersion, the halogenated benzene species are reduced to benzene, with concomitant oxidation of the sodium to sodium halide and hence their presence adds to the consumption of sodium in the system. In addition, the presence of halogenated benzene in the reaction mixture increases the total volume of material to be reacted and hence increases the energy consumption and operating costs of the dehalogenation process. Moreover, the dehalogenated product, namely benzene, is toxic and is a volatile liquid which tends to be evolved in vapour form from the reaction mixture under the elevated temperatures normally reached in the exothermic dehalogenation process. Accordingly, with known processes, special absorptive filters or other arrangements should be employed to avoid releases of toxic benzene vapour.

The present invention in one aspect relates to a procedure for removing chlorobenzenes from askarels and like mixtures of PCBs and chlorobenzene in order to obtain a mixture with reduced chlorobenzene content which can be more efficiently subjected to PCB destruction employing reaction with sodium dispersion. Further, the invention relates to improvements in the PCB destruction processes whereby the mixture impoverished in chlorobenzenes can be rapidly and efficiently reacted with the sodium dispersion, without the need to add reaction catalysts, to achieve a product substantially free from PCB. Further, the invention relates to improvements in the techniques employed for dispensing a measured quantity of sodium dispersion.

In one aspect, the present invention is based on the finding by the inventors that by conducting fractional distillation of askarels and like mixtures of PCBs and chlorobenzenes, the quantities of chlorobenzenes present in such mixtures can be significantly reduced, in that substantial quantities of the more volatile chlorobenzenes can be efficiently distilled out, and that it is readily possible to separate off, in substantial quantities, a distillate which contains less than 2 ppm PCBs and is thus safely eligible for disposal without needing to take the stringent precautions necessary for disposal of PCBS. Such separation can be effected at relatively high rates of throughput without requiring the use of large or expensive distillation apparatus.

Accordingly, the present invention provides a method for the destruction of polychlorinated biphenyls (PCBs) wherein said PCBs are present in the form of a mixture with chlorinated benzenes, comprising subjecting said mixture to fractional distillation, separating a distillate rich in chlorinated benzenes and containing less than 2 ppm PCBs, collecting a bottoms poor in chlorinated benzenes and rich in PCBs, and reacting said bottoms with a dispersion of sodium particles to reduce substantially all said PCBs to biphenyl.

As is, of course, well understood by those skilled in the art, in the course of fractional distillation, separation of more volatile from less volatile components takes place within a fractionating column through which vapours rise, and a certain amount of liquid, termed reflux, descends. The vapours usually originate from a heated reboiler at the bottom of the column and the reflux liquid usually originates from condensation of vapours at a condenser at the upper end of the column. As the hot vapours from the reboiler come into contact with cooler descending reflux liquid, there is a progressive enrichment of the more volatile constituents upwardly through the column and progressive enrichment of the less volatile constituents downwardly through the column. The column may be, for example, a packed or differential stage contactor column or may be a plate, tray or finite stage contactor column, and the distillation may be conducted continuously or in batch mode. Preferably, the distillation is conducted continuously by reason of greater efficiency of operation.

Askarel and like mixtures currently stored and requiring disposal and destruction contain a wide variety of components. Some of these mixtures contain substantial quantities of mono-, di- and trichlorinated biphenyls. Such mixtures normally exist as neat PCBs, since the PCBs having lower degrees of chlorination, namely having up to about three chlorines atoms per molecule, tend to have adequate low temperature flow characteristics or viscosities without requiring addition of chlorobenzenes or like diluents in order to thin the mixture. Other askarels, however, contain substantial quantities of tetra- to nonachlorinated or more highly chlorinated biphenyl species and these normally exist in the form of a mixture with chlorobenzenes, the total concentration of the chlorobenzenes varying somewhat depending on the nature of the PCBs and on the application for which the askarel was intended. Further variability in the composition of the askarels is added by the fact that the chlorobenzenes employed as viscosity-reducing diluents range from monochlorobenzene to hexachlorobenzene making a total of twelve congeners including the various isomers of di-, tri- and tetrachlorobenzene.

Advantageously, in the present invention the fractional distillation is applied selectively to mixtures having relatively low contents of mono, di- and trichlorobiphenyls, relatively high contents of chlorinated benzenes and relatively low contents of tetra- or more highly chlorinated benzenes. If the content of lower chlorinated biphenyls is too high, there tends to be greater difficulty in significant reduction of the content of chlorobenzenes without carry over of any substantial quantity of PCBs in the distillate. If the total content of chlorinated benzenes is excessively low, significant reduction in the quantity of PCB mixture cannot be achieved, and if the content of tetra- or more highly chlorinated benzenes is excessively high, there again tends to be difficulty in distillation off of a significant proportion of the chlorobenzenes without carry over of any substantial quantity of PCBs into the distillate. Desirably, in the most preferred forms of the present invention about 75% to about 95% by weight of the chlorobenzenes are removed from the askarel starting material, based on the total weight of chlorobenzenes present in the mixture.

Preferred ranges of compositions to which the distillation procedure according to the present invention is applied are shown in Table 1.

In order to achieve a desired degree of separation in the fractionation column a certain range of the number of theoretical stages together with a certain range of reflux ratios are preferred. As is well understood by those skilled in the art, a theoretical stage refers to a contacting stage at which equilibrium is attained between the liquid and vapour. The number of theoretical stages in column is, as is well understood by those skilled in the art, dependent on the dimensions and geometry of the column and on form of construction of the trays or plates or on the nature of the packing material in the case of a packed column. The reflux ratio is the ratio of the volume of distillate returned from the condenser to the column to the volume of distillate withdrawn from the condenser.

TABLE 1

| | Approximate % by weight based on total weight of composition | | |
|---|---|---|---|
| | Preferred | More Preferred | Most Preferred |
| Total PCBs | 30–70 | 45–70 | 45–70 |
| monochlorobiphenyls | 0–3 | 0–1 | <0.5 |
| dimonochlorobiphenyls | 0–10 | 0–5 | <0.5 |
| trimonochlorobiphenyls | 0–30 | 0–20 | 0–10 |
| Cumulative total tetra- and higher polychlorinated biphenyls | 15–70 | 40–70 | 50–70 |
| Total chlorinated benzenes | 30–70 | 30–55 | 30–55 |
| Cumulative total tetra- or higher chlorinated benzenes | 0–20 | 0–10 | 0–10 |

As the reflux ratio is increased, the number of theoretical stages required for a given separation decreases. Generally, however increase in the reflux ratio beyond a certain point may tend to reduce the rate of throughput of distillate undesirably, as well as increasing the operating costs and energy costs resulting from increased demand for heating at the reboiler and for coolant at the condenser, while increase in the number of theoretical stages beyond a certain point may tend to increase the dimensions of the column undesirably and thus tend to increase the costs also. Preferably, in the present process a column having about 10 to about 40, more preferably about 20 to about 30, theoretical stages is employed, and a reflux ratio about 1 to about 5, more preferably about 2 is employed.

Preferably, the fractional distillation is conducted under subatmospheric pressure. This has the advantage that the lower the pressure, the lower temperature of operation of the reboiler and of the condenser, thus tending to save energy costs and increasing the intrinsic safety of operation of the column. In addition, it has been found that with the above described askarel composition, operation at reduced pressure is thermodynamically favourable, apparently because of a non-linear relationship between temperature and the vapour pressures of the components of the compositions. For example it may be desired to separate 94% of the chlorobenzenes from a mixture having relatively high contents of tetrachlorobenzene and mono-, di- and trichlorobiphenyls by weight (30% trichlorobenzene by weight, 10% tetrachlorobenzene, 0.6% monochlorobiphenyl, 9.6% dichlorobiphenyl, 29.4% trichlorobiphenyl, and 20.4% tetrachlorobiphenyl), with less than 2 ppm carry over of PCBs. At an operating pressure of 100 mm Hg a column with 30 theoretical stages is necessary to achieve this separation, with operating temperatures in the column ranging from 150 to 250° C. Under equivalent conditions, operating at 10 mm Hg pressure, the same separation is achieved using 25 theoretical stages and operating temperatures of 100 to 200° C. However, excessively low pressures tend to create mechanical problems since it is difficult or expensive to construct the apparatus to be capable of withstanding large pressure differences. Preferably, the operating pressure is in the range about 5 mm Hg to about 40 mm Hg, more preferably about 5 to about 20 mm Hg.

As indicated above, preferably the fractionation is carried out continuously. In such case it is highly preferred that the feed of the mixture to be distilled be supplied to the column at an intermediate point adjacent the lower end thereof. For example, in the case of a column having 25 theoretical stages, the feed is supplied at a point corresponding to about 5 theoretical stages from the bottom of the column. If the feed is made at or adjacent to the upper portion of the column, there is a tendency for breakthrough of excessive quantities of PCBs to the distillate, especially when feeds containing appreciable quantities of mono-, di- or tri-chlorinated biphenyls. If the feed is made at or below the lower end of the column, heating of the feed to a temperature at or above the temperature of vaporization of the feed is necessary, since it is usual to preheat the feed to the steady state temperature of the column at the point of input in order to avoid disturbance of the steady state temperature profile. However, as will be appreciated there are considerable difficulties and hazards involved in working with vaporized feeds outside the confines of the fractionation column.

In the preferred form, PCBs to be destroyed, such as the bottoms impoverished in chlorobenzenes obtained from the above described distillation are reacted with the sodium dispersion by contacting a measured batch of said bottoms isolated in a reaction vessel, at a temperature of about 120° C. to 160° C., and having a concentration of PCBs of about 15,000 to about 80,000 ppm, with a measured batch of said sodium dispersion containing at least a weight of sodium stoichiometrically required to react with the chlorine in said PCBs while vigorously agitating the reaction mixture in order to obtain an autocatalytic reaction.

It may be noted that the reaction is preferably conducted as a batch process since control of the quantities of the reactants and of the reaction conditions is greatly facilitated in batch processing, rather than continuous processing, enabling substantially complete destruction of the PCBs. For example with batch processing it is possible to maintain control of the reaction until, as indicated by testing of samples withdrawn from the reactor, no PCB is detectable in the reaction mixture. With continuous processing control of the reaction is not easily maintained and since at steady state a gradient or profile of reactant concentrations is achieved, at least in theory, in order to obtain a zero concentration of PCBS in the output stream an infinitely long reaction vessel may be required.

With the temperatures and PCB concentrations noted above in the preferred form of the reaction, under vigorous agitation, an autocatalytic reaction can be achieved in which there is a rapid and sustained rise in the rate of reaction, which proceeds vigorously exothermically, without the need for addition of any catalyst to sustain the reaction rate. In such case, once the reactants have reached a temperature at which reaction commences, it is normally necessary to cool the reactants, for example by flowing coolant through a cooling coil with which the reaction vessel is equipped in order to avoid excessive temperature rise, leading to such problems as possibly reaching of the flash point of the reactant mixture or polymerization of, for example, mineral oil constituents of the reaction mixture. Desirably the content of PCBs in the reaction mixture is not substantially in excess of about 80,000 ppm, since with concentrations greatly in excess of this value, depending on the degree of chlorination of the PCBs, there tends to be excessive heating of the reaction mixture as a result of excessively vigorous exothermic reaction lending to the problems mentioned above as well as generation of excessive quantities of solid NaCl, which leads to problems in pumping and agitation of the reaction mixture and also producing excessive quantities of biphenyl or polybiphenyl which is a solid at room temperature and can also lead to problems of dealing with the reaction mixture.

In the preferred form the process is operated with only a small excess of sodium over the stoichiometric amount. In view of the efficiency of reaction, it has been found that satisfactory destruction of the PCBs can be achieved in relatively short reaction times with a molar ratio of sodium to chlorine of about 1.2 to about 4, more typically about 1.5.

Once the PCB destruction reaction has commenced to decline, small amounts of water are preferably added to reaction mixture, preferably in an amount of about 2 to about 10% based on the weight of sodium added. The addition of water is believed to generate free radicals, and is found to complete the destruction of PCBs within a shorter time.

A further aspect of the present invention relates to a procedure for obtaining and dispensing a measured batch of a sodium dispersion. Examples of the dispersions to which the invention may be applied include dispersions containing about 20% to about 60% by weight sodium, the balance comprising an inert oil such as mineral oil. In preferred examples, the particle size of the sodium in the dispersion is about 2 to about 10 microns, more preferably about 5 microns. Sodium dispersions of the above type are available from various supplies of laboratory and industrial chemicals. In the past attempts have been made to meter a quantity of sodium dispersion using metering pumps. However, the sodium is highly adherent and tends to adhere to propeller vanes or other moving elements of the pumps leading to disabling of the pump. Cleaning of the pump is a hazardous procedure because of the danger of burns resulting from contact with the sodium or of explosion of the sodium.

Further attempts have been made to measure quantities of sodium by using vessels supported on weighing balances, into which vessels the sodium dispersion is supplied. However this is a cumbersome procedure since normally the vessel is equipped with various supply and withdrawal lines and variations in the quantities of reactants remaining in the lines can give rise to uncertainty in the result. Attempts have also been made to measure quantities of sodium dispersion using vessels equipped with level indicating devices such as floats. However, the sodium tends to adhere to the floats rendering them inoperative.

In the present invention there is provided a method for obtaining a measured batch of a sodium dispersion, comprising the steps of supplying said dispersion under pressure into a closed vessel containing an inert gas and equipped with a pressure indicator until the pressure indicator indicates a predetermined pressure, interrupting the supply of said dispersion, and expelling the dispersion from the vessel under pressure exerted by the inert gas compressed within the vessel.

This procedure avoids the need for any form of weighing apparatus and enables measuring of the sodium dispersion without contact with any moving parts such as floats or pump elements.

The invention will now be more fully described, by way of example only, with reference to the accompanying drawings in which.

Figure 1:
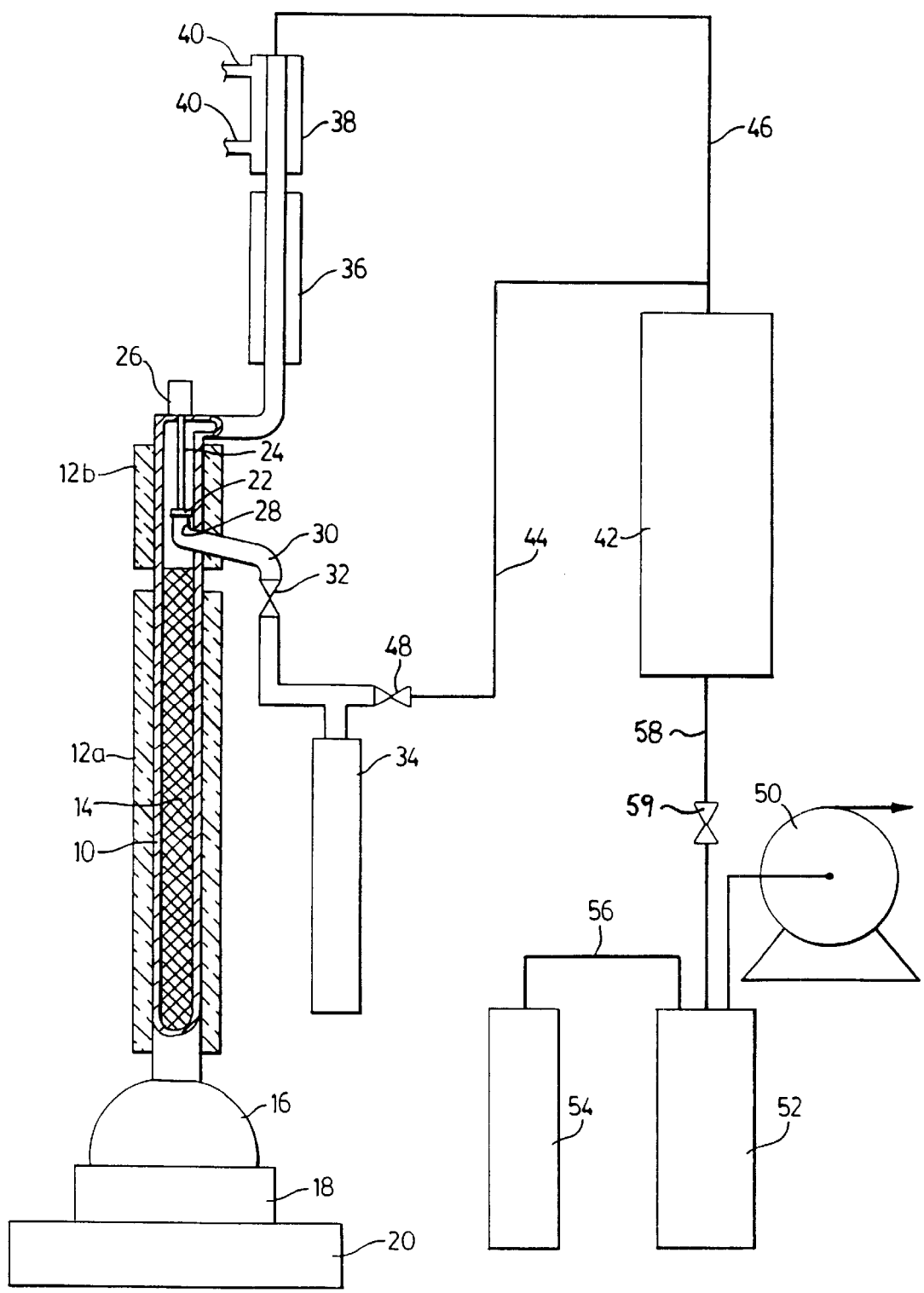
FIG. 1 shows partially schematically and partially in cross-section a fractional distillation apparatus operating under subatmospheric pressure.

FIG. 1 shows a fractionation column 10 which may, for example be of glass and which is surrounded by heat insulative jacketing 12a and b. In the example shown, the interior of the column is packed with a packing 14 which may for example comprise any inert random or stacked packing material suitable for producing desired vapour-liquid contacting efficiencies and throughputs. Any of the traditional packing materials may be employed. Instead of packing as will be appreciated it is possible to use the equivalent tray or plate structures. Preferably, because of its higher flood velocity, allowing a substantial reduction in a column diameter for a given feed and distillate rate, a Goodloe mesh packing, available from Pegasus Industrial Specialties Ltd., Agincourt, Ontario, Canada or from Metex Process Equipment Corp., Edison, New Jersey, U.S.A., is employed.

The lower end of the column is connected to a reboiler 16 into which the mixture to be distilled is introduced. The reboiler is provided with a heater 18 and a magnetic stirrer apparatus 20.

The upper end of the column 10 is equipped with a reflux controller comprising a valve 22 connected to an operating stem 24 actuated by a solenoid 26. When raised in the open position, the valve allows distillate to run through an opening provided by a valve seat 28 into a conduit 30 provided with a valve 32 and connected to a distillate collector 34. When the valve is lowered, in the closed position, the distillate runs back as reflux into the column 10. By controlling the ratio of the periods for which the valve remains closed to the periods for which the valve is open, the reflux ratio can be controlled. The upper end of the column 10 is connected to a condenser 36 which can be maintained at a predetermined temperature above ambient, for example with electrically resistive heating elements. Above the condenser 36 is a cold condenser 38 supplied with coolant, for example cold water along lines 40. The distillate collector 34 and the cold condenser 38 are connected to a vacuum reservoir 42 by lines 44 and 46, the former through a valve 48. The reservoir 42 is maintained evacuated by a vacuum pump 50, the suction side of which draws from the interior of a dewar flask 52 maintained at cryogenic temperature by, for example, liquid nitrogen fed from a cylinder 54 along a line 56. The interior of the flask 52 is also connected through a line 58 and a throttle valve 59 to the reservoir 42. Hence, any condensible vapour in the gas drawn from the reservoir 42 is collected in the cryogenic flask 52 and is not passed to the atmosphere from the pressure side of the pump 50.

In use, a batch of the askarel mixture is placed in the reboiler 16 and the vacuum pump 50 is operated to draw the system down to the desired subatmospheric operating pressure. The condenser 36 is maintained at a desired condenser temperature and the reboiler 16 is heated to the desired distillation temperature. As the distillation continues, the reboiler temperature and condenser temperature are increased up to the point at which distillation of PCBS is imminent. The distillation is then terminated and the bottoms residue in the reboiler retained for PCB destruction. The PCB-free distillate collected in the collector 34, consisting of chlorobenzenes, has an economic value, for example for use as a source of chemical reagents and is collected, stored and transported to the users.

As mentioned above, preferably the above described distillation is carried out continuously. Such continuous distillation can be carried out using a modified version of the apparatus shown in FIG. 1 wherein a feed to the mixture to be distilled is supplied continuously to the column 10 preferably at an intermediate point adjacent to a lower end of the column 10, chlorobenzene rich distillate is well drawn continuously from the reflux collector 34 and is disposed of, and chlorobenzene impoverished bottoms are withdrawn continuously from the reboiler 16 for PCB destroying reaction.

Figure 2:
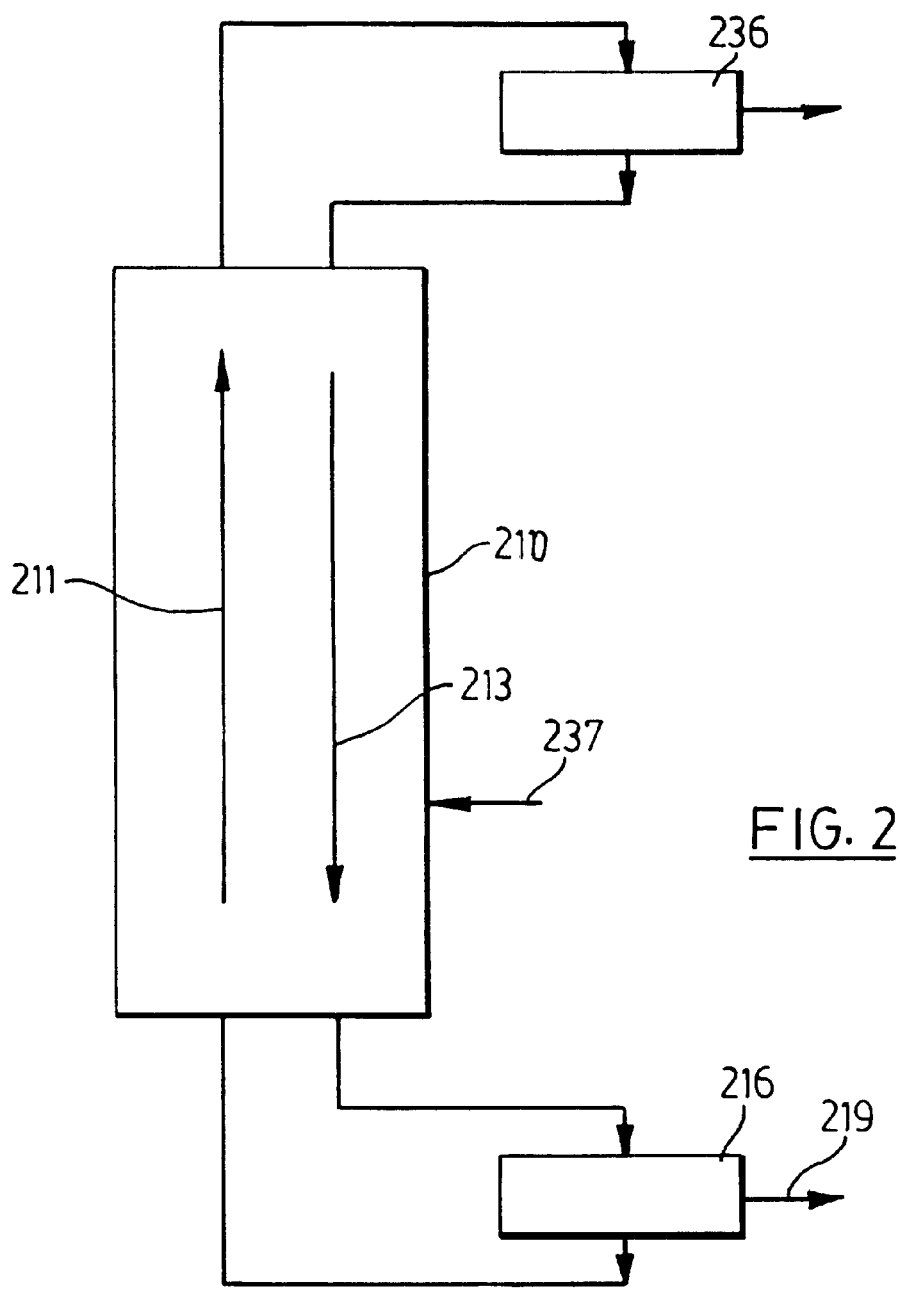
FIG. 2 shows schematically a continuous fractional distillation apparatus.

FIG. 2 illustrates somewhat schematically continuous distillation apparatus as described above, having a fractionation column 210 within which vapours 211 with progressively increasing chlorobenzene enrichment ascend and reflux 213 with progressively greater chaorobenzene impoverishment descends, the column 210 being connected to a reboiler 216 from which a supply of bottoms PCB rich product is taken continuously along line 219 and a reflux controller and condenser arrangement 236 from which chlorobenzene rich distillate is continuously withdrawn. A feed of the mixture of PCB and chlorobenzene is introduced into the column in the liquid phase along a feed line 237 adjacent a lower portion of the column 210.

Figure 3:
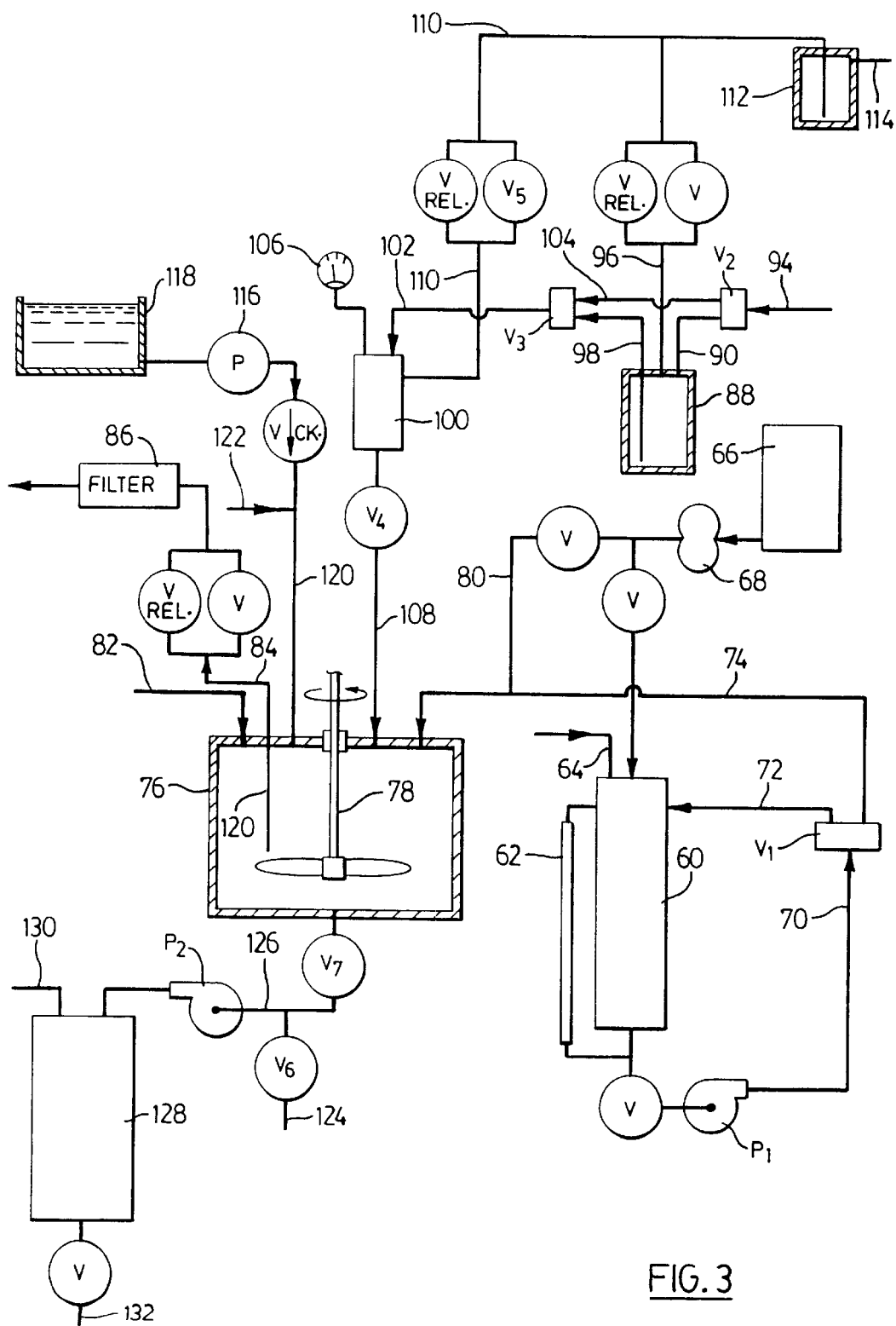
FIG. 3 shows schematically apparatus for destruction of PCBs.

In the example illustrated in FIG. 3, PCBs to be destroyed which may be bottoms obtained from the above described distillation procedure, are run into a mixing vessel 60, equipped with a sight glass 62, along a line 64. Normally, the PCB is at a concentration greater than is desirable for easily controlled reaction, and it is desired to dilute the PCB in the mixing vessel 60. After a predetermined quantity of the PCB has been run into the vessel 60, as determined by inspection of the sight glass 62, a measured quantity of clean oil from a clean oil reservoir 66 is pumped into the vessel 60, after opening of the appropriate valves, by a gear pump 68. The figure shows various valves the operation of which will be well understood by those skilled in the art and the sequences of opening and closing various of all these valves need not be described in detail herein. A pump $P_1$ is then operated and a motorized valve $V_1$ is activated so that the liquid in the vessel is flowed in a closed loop along lines 70 and 72 through the vessel 60 until the contents are thoroughly mixed. The valve $V_1$ is then actuated so that the contents of the vessel 60 are pumped out along a line 74 into a reactor 76. Preferably, the reactor 60 is a baffled reactor equipped with a six blade turbine type impeller having a diameter of not less than 0.4, more preferably about 0.8 to 0.4, times the internal diameter of the reactor and rotating at at least 750 rpm, preferably 750 to 1500 rpm. Usually, the reactor 76 is jacketed in heat insulating material and is equipped with devices for heating and for cooling the contents of the reactor.

A small amount of clean oil is then passed by the pump 68 along a line 80 to flush out the portion of the line 74 leading to the reactor with clean oil, so that, after the PCB destruction reaction is completed, drops of PCB from the line 74 will not contaminate the contents of the reactor 76.

Nitrogen or other inert gas is then flowed to the gas space above the liquid in the reactor 76 through a line 82 in order to maintain an inert gas blanket above the liquid. This reduces or eliminates any risk of combustion within the reactor 76 and flushes out hydrogen formed in the reactor during subsequent reaction, and avoids build up of any combustible gas mixture. The flushed out gas from the reactor is vented to the atmosphere along a line 84 equipped with a valve and a pressure relief valve, through a filter 86.

The contents of the reactor 76 are heated to a desired reaction temperature, for example 120 to 130° C. by the heating device which may be for example band heaters on the wall of the reactor.

FIG. 3 shows a sodium dispersion supply cylinder 88 typically containing a large quantity, for example 60 L, of sodium dispersion. The cylinder 88 is equipped with a gas inlet line 90 connected through a flow diverting valve $V_2$ to a supply 94of pressurised nitrogen or other inert gas. A vent and filling line 96 is also connected to the cylinder 88 and connects to a pressure relief valve and a normally closed filling valve connected in parallel. A dip tube 98 connects the bottom of the cylinder to a second flow diverting valve $V_3$ connected preferably to the upper end of a metering vessel 100 through a line 102. The pressurized nitrogen supply is also connectible to the metering vessel through a line 104 passing between the flow diverting valves $V_2$ and $V_3$. A pressure gauge 106 is connected to the upper end of the metering vessel 100 and a dump valve $V_4$ connects the lower end of the vessel 100 to the reactor 76 along a line 108. A sodium supply cylinder such as that described above as cylinder 88 may be obtained under the trade-mark UNILINE from Manchester Tank Co. of Lynwood, Calif., U.S.A.

In use, initially nitrogen or other inert gas is used to flush out the metering vessel 100 by connecting the same 94 along lines 104 and 102 to the vessel. The inert gas exits the vessel 100 through a line 110 having a valve $V_5$ connected in parallel with a pressure relief valve. The vent and filling line 96 from the sodium supply cylinder 88 also connects to the line 110. The line 110 passes into the bottom of an empty sodium trap vessel 112 which is vented to the atmosphere through a line 114. The valve $V_5$ is closed and the valve $V_2$ actuated to connect the gas inlet line 90 to the high pressure source 94 in order to pressurize the contents of the supply cylinder 88. The valve $V_3$ is actuated to connect the dip tube 98 and the line 102, and sodium dispersion is displaced from the cylinder 88through the line 102 to the metering vessel 100. The sodium dispersion entering the vessel 100 compresses the nitrogen in the gas space above the liquid level of the dispersion, so that increasing pressure is indicated on the gauge 106. As will be appreciated, the gauge pressure can be correlated to the quantity of dispersion displaced into the vessel 100, and when the gauge shows a pressure corresponding to the desired measured amount of sodium dispersion, the valve $V_3$ is actuated to a condition closing the line 102. The valve $V_4$ is opened so that the compressed gas in the gas space expels the dispersion along the line 108 into the reactor 76. Preferably the dispersion is displaced from the vessel 100 by the autogenous pressure of the compressed gas within its upper end but if desired the displacement may be assisted by pressurized nitrogen by actuating valves $V_2$ and $V_3$ to connect the source 94 along the line 104 and the line 102 to the upper end of the vessel 100. After vessel 100 is purged with nitrogen along lines 102 and 104, valve $V_4$ is closed and the nitrogen supply stopped. The valve V in the line 96 and the valve $V_5$ are then opened to eliminate pressure in the supply cylinder 88 and any remaining pressure in the metering vessel 100. The above cycle of operation may be repeated at the next point at which there is a demand for sodium dispersion in the reactor 76. As will be appreciated the relief valve in the line 110 is set at a pressure above the pressure desired to be generated in the vessel 100 and above the pressure set in the relief valve in the line 96. For example, the pressure generated in the vessel 100 may be approximately 15 psi, the pressure setting of the relief valve in the line 110 may be for example 25 psi, and the setting of the relief valve in the line 96 may be 20 psi. This ensures sodium is not pushed through the line 110 during the step of displacing sodium under pressure from the supply vessel 88 to the metering vessel 100.

Preferably, as shown the line 102 through which sodium dispersion is introduced into the metering vessel 100 connects to the upper end of the vessel so that the action of gravity clears sodium dispersion from the line 102. This avoids risk of sodium dispersion collecting in the line 102 and of sodium settling out to form a solid mass.

On introduction of the sodium into the well stirred reactor 76 a vigorously exothermic reaction ensues. At this point the reactor 76 may be cooled with cooling coils (not shown) in order to maintain the desired operating temperature and to avoid excessively vigorous reaction. After the temperature in the reactor 76 is stabilized a small quantity of water may be injected into the reactor 76 by a pump 116 from a tank 118 through a check valve along a line 120 dipping below the liquid level in the reactor in order to create free radicals. The line 120 may be purged down into the reactor 76 with nitrogen or other inert gas introduced along a line 122.

Samples of the reaction mixture may be taken at intervals, e.g. every 30 minutes, from a sample line 126 connected through a sample valve $V_6$ and a drain valve $V_7$ to the reactor 76. When analysis of the samples shows substantially no PCB content, excess sodium in the reactor may be neutralized by slow injection of a sufficient quantity of a neutralizing agent along the line 120 under nitrogen purging. Such neutralizing agent may be any compound having reactive hydrogen, such as water, an alcohol, for example isopropyl alcohol, or an acid, which reacts with sodium to form hydrogen and a sodium compound which reacts moderately with or is inert with respect to water.

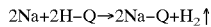

wherein -Q may be, for example, -OH, -OR wherein R is an alkyl group, or -X wherein -X is an acid anion, e.g. halide.

Preferably, the neutralizing agent is water. The flow of nitrogen along line 82 is increased to flush out hydrogen formed by reaction of the water or other neutralizing agent with the excess sodium.

Upon completion of excess sodium neutralization, the contents of the reactor 76 are pumped out through the valve $V_7$ and a line 126 by a pump $P_2$, to a waste oil storage vessel 128 which is vented to the atmosphere through a line 130. The above cycle of operation commencing with introduction of PCBs into the mixing vessel 60 can then be repeated.

The waste oil in the vessel 128 separates out into a sludge, which is periodically withdrawn through a line 132 connected to the bottom of the vessel 128 and is disposed of, and a supernatant liquid which may be recirculated to the clean oil reservoir for use as a diluent of concentrated PCBs.

The above description provides ample information to enable one of ordinary skill in the art to carry out the present invention. For the avoidance of doubt however, some detailed Examples of procedures for carrying out the present methods will be given.

EXAMPLE 1

A vacuum distillation apparatus was employed as described above with reference to FIG. 1. The distillation unit comprised a vacuum jacketed glass column having 25 theoretical stages.

The reboiler was charged with 1000 ml (1502 g) of askarel. Analysis of this feed askarel indicated that it contained 32.43% chlorobenzenes with the balance being a blend of aroclor 1254 and aroclor 1260. Aroclor 1254 consists by weight of 11% tetrachlorobiphenyls, 49% pentachlorodiphenyls, 34% hexachlorobiphenyls and 6% heptachlorobiphenyls. Aroclor 1260 consists by weight of 12% pentachlorobiphenyls, 38% hexachlorobiphenyls, 41% heptachlorobiphenyls, 8% octachlorobiphenyls and 1% nonachlorobiphenyls.

Figure 4:
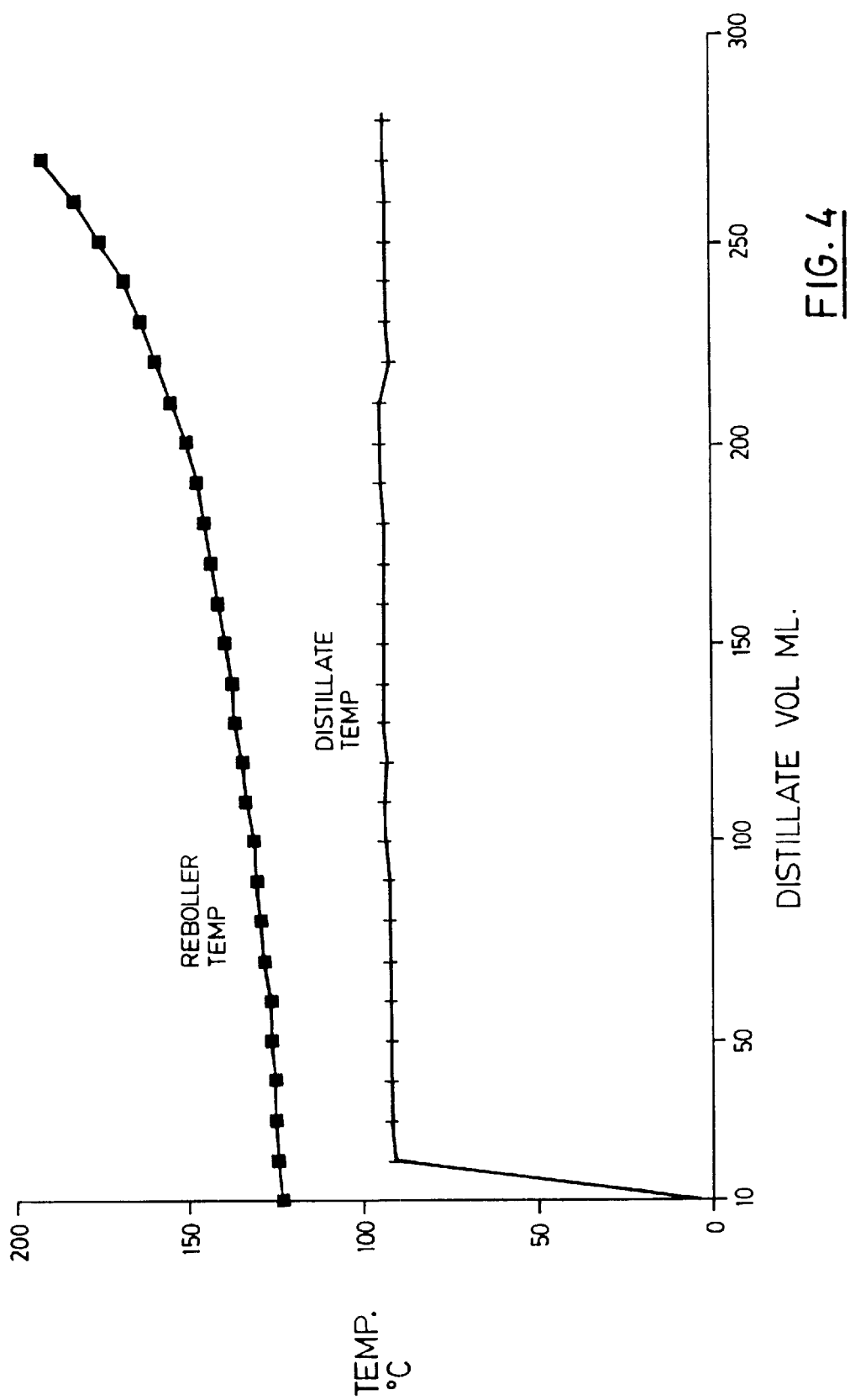
FIG. 4 shows a graph of distillate and reboiler temperatures against volume of distillate collected for a batch fractional distillation.

Distillation of this liquid at a pressure of 12 mm Hg, a reflux ratio of 2 and take off rate of 1–2 ml/min yielded a total of 275 ml of distillate. This distillation rate resulted in a 16 hr total distillation time. Given a constant heat input, the rate of distillate output remained the same for the first 250 mls. This initial liquid was primarily 1,2,4-trichlorobenzene. At this point the distillation rate decreased and solid began to condense in the unheated receiver. When the receiver flask was heated, more liquid collected in the receiver until approximately 280 ml of liquid had been distilled. This solid distillate was 1,2,3-trichlorobenzene. At this point no more liquid distilled unless a much higher heat input was used. FIG. 4 illustrates the reboiler and distillate temperatures versus distillate volume.

Table 2 lists a detailed analysis of the askarel feed stock, the distillate fractions and the reboiler residue for the distillation. It will be noted that the chlorobenzene percentage in the reboiler was reduced from 32.43% to 2.36% with no PCB carry over.

TABLE 2

| -chloro benzenes | Initial feed Askarel % | 0–100 ml Fraction % | 100–200 ml Fraction % | 200–275 ml Fraction % | Reboiler Residue % |
|---|---|---|---|---|---|
| 1,3-di- | 0.2 | 1.5 | 0.0 | 0.0 | 0.0 |
| 1,4-di- | 0.06 | 0.48 | 0.0 | 0.0 | 0.0 |
| 1,2-tri- | 0.34 | 3.0 | 0.0 | 0.0 | 0.0 |

TABLE 2-continued

| -chloro benzenes | Initial feed Askarel % | 0–100 ml Fraction % | 100–200 ml Fraction % | 200–275 ml Fraction % | Reboiler Residue % |
|---|---|---|---|---|---|
| 1,3,5-tri- | 0.0 | 0.38 | 0.13 | 0.0 | 0.0 |
| 1,2,4-tri- | 24.0 | 94.3 | 90.7 | 7.61 | 0.0 |
| 1,2,3-tri- | 6.93 | 6.43 | 9.24 | 90.17 | 1.15 |
| 1,2,3,5 and 1,2,4,5-tetra-tetra- | 0.41 | 0.0 | 0.0 | 0.0 | 0.55 |
| 1,2,3,4-tetra | 0.49 | 0.0 | 0.0 | 0.0 | 0.66 |
| Total Chloro benzenes | 32.43 | | | | 2.36 |
| PCBs | 67.57 | 0.0 | 0.0 | 0.0 | 97.64 |

EXAMPLE 2

A continuous distillation is carried out in accordance with the arrangement shown in FIG. 2. A column 2.5 cm in diameter 1.38 m high is employed, filled with Goodloe mesh. The pressure is maintained at 10 mm Hg. The column has 25 theoretical stages and a liquid askarel feed, at a temperature of 106° C. is introduced at a point corresponding to 5 theoretical stages from the bottom of the column at a flow rate of 500 g/hr. The reflux ratio is 2. The reboiler is maintained at 177° C. and a bottoms fraction is continuously withdrawn from the reboiler at a rate of 312.5 g/hr. The condenser is maintained at 96° C. and distillate is withdrawn at a rate of 187.5 g/hr. The feed corresponds to a mixture of, by weight Aroclor 1242 60%, trichlorobenzenes 35% and tetrachlorobenzenes 5%. Aroclor 1242 consists of, by weight, 3% monochlorobiphenyl, 13% dichlorobiphenyls, 28% trichlorobiphenyls, 30% tetrachlorobiphenyls, 22% pentachlorobiphenyls and 4% hexachlorobiphenyls. This is a particularly refractory mixture because of its relatively high content of mono-, di- and trichlorobiphenyls and its relatively high content of tetrachlorobenzene.

The following compositions are obtained

TABLE 3

| | Compositions % by weight | | |
|---|---|---|---|
| Component | Feed | Distillate | Bottoms |
| trichlorobenzenes | 35.0 | 95 | 2.7 |
| tetrachlorobenzenes | 5.0 | 5 | 5.0 |
| monochlorobiphenyl | 0.6 | 0 | 0.9 |
| dichlorobiphenyls | 9.6 | 0 | 14.8 |
| trichlorobiphenyls | 29.4 | 0 | 45.2 |
| tetrachlorobiphenyls | 20.4 | 0 | 31.4 |

It will be noted that even with this particularly refractory mixture, 95% of the chlorobenzenes present in the original askarel can be removed without carry over of the PCB into the distillate.

EXAMPLE 3

Employing the apparatus shown in FIG. 3, ten litres of clean Voltesso 35 insulating oil were transferred to the PCB/oil mixing tank. Neat aroclor 1242 in the amount of 377 grams was subsequently added to the oil producing a PCB contamination level of 43,100 ppm. The blend was recirculated in the mixing manifold for 20 minutes and transferred to the rector where it was heated under nitrogen until 120° C. was reached. Meanwhile 500 ml of sodium dispersion (200 grams of metallic sodium) was transferred from the supply cylinder to the sodium metering unit and discharged into the reactor. The dispersion consists of, by weight, 60% mineral oil and 40% sodium, particle size 5 microns. Upon completion of the sodium addition, the temperature of the reacting mixture started to rise and the cooler in the reactor was turned on to avoid the temperature of the fluid climbing above 150° C. Once the temperature of the reacting mixture was stabilized at 140° C., 10 grams of water were injected into the reactor. The exothermic reaction between sodium and water made the temperature of the fluid rise to 145° C. under which the reactor was maintained for two hours. Samples of the fluid were taken every 30 minutes and analyzed by gas chromatography using a capillary column and an electron capture detector. All samples revealed total PCB concentrations below 2 ppm with monochlorobiphenyl the only congener detected. The excess sodium in the mixture was subsequently quenched with slow, continuous addition of water. The final product was a mixture of a brown fine solid and partially oxidized, brown insulating oil.

EXAMPLE 4

In a similar manner to Example 3, 700 grams of aroclor 1242 were blended with 10 litres of insulating oil producing a PCB contamination level of 80,000 ppm. The mixture was then heated up to 120° C. and then 600 ml of sodium dispersion (240 grams of metallic sodium) were injected into the reactor. Upon addition of 10 grams of water the reacting fluid was kept at 130° C. for two hours. Samples taken after 30, 60, 90 and 120 minutes revealed total PCB concentrations of 7.4, 2.5, 3.6 and 1.6 ppm respectively. The excess sodium was neutralized with water upon completion of the run.

EXAMPLE 5

As in Example 3, 372 grams of askarel distillation bottoms (97.6% PCBs and 2.4% chlorobenzenes) were mixed with 10 litres of insulating oil producing a PCB contamination level of 40,600 ppm. The blend was heated up to 120° C. and then 725 ml of sodium dispersion (290 grams of sodium) were injected into the reactor. The sodium addition was performed in two stages. In the first stage, 350 ml of sodium dispersion were added into the reactor causing the temperature of the fluid to rise to 141° C. The final sodium dispersion addition (375 ml) was done after the fluid had been cooled down to 135° C. Upon completion of the second sodium injection, the temperature of the fluid rose to 146° C. Ten grams of water were subsequently added into the reacting blend and this was maintained at 130° C. for 30 minutes. Analysis of the sample after 30 minutes reaction time revealed a total PCB content of 2 ppm. Monochlorobiphenyl and dichlorobiphenyl were the only two PCB congeners detected in the resulting fluid. The excess sodium was subsequently quenched with water.

What is claimed is:

1. A method for the selective destruction of polychlorinated biphenyls (PCB's) from a PCB mixture containing chlorobenzene species having different degrees of chlorine functionality and consisting essentially of by weight of the total mixture from 30 to 70% total PCB's and from 70 to 30% chlorobenzenes, the method comprising the steps of:
   a) fractionally distilling the PCB mixture into a chlorobenzene-rich distillate containing less than 2 ppm PCB's and a PCB-rich residue poor in chlorobenzenes;

b) reacting the PCB-rich residue with a dispersion of sodium particles until substantially all of the PCB's therein are reduced to chlorine-free biphenyls;

c) removing the chlorine-free biphenyls; and d) recovering the chlorobenzene-rich distillate.

2. Method as claimed in claim 1 wherein said mixture comprises, by weight of the total mixture, 0 to about 3% monochlorobiphenyls, 0 to about 10% dichlorobiphenyls, 0 to about 30% trichlorobiphenyls, a cumulative total of tetra- and higher chlorobiphenyls of about 15 to about 70%, and a cumulative total of tetra- and higher chlorinated benzenes of about 0 to about 20%.

3. Method as claimed in claim 1 wherein said mixture comprises, by weight of the total mixture, 0 to about 1% monochlorobiphenyls, 0 to about 5% dichlorobiphenyls, 0 to about 20% trichlorobiphenyls, a cumulative total of tetra- and higher chlorobiphenyls of about 40 to about 70%, and a cumulative total of tetra- and higher chlorinated benzenes of about 0 to about 10%.

4. Method as claimed in claim 1 wherein said mixture comprises, by weight of the total mixture, less than about 0.5% dichlorobiphenyls, 0 to about 10% trichlorobiphenyls, a cumulative total of tetra- and higher chlorobiphenyls of about 50 to about 70%, and a cumulative total of tetra- and higher chlorinated benzenes of about 0 to about 10%.

5. Method as claimed in claim 1 wherein said distillation is conducted under subatmospheric pressure.

6. Method as claimed in claim 5 wherein said pressure is about 5 mm Hg to about 40 mm Hg.

7. Method as claimed in claim 6 wherein said pressure is about 5 to about 20 mm Hg.

8. Method as claimed in claim 1 wherein said distillation is conducted in a fractionation column having about 10 to about 40 theoretical stages and using a reflux ratio of about 1 to about 5.

9. Method as claimed in claim 8 wherein said column has about 20 to about 30 theoretical stages and said reflux ratio is about 2.

10. Method as claimed in claim 8 wherein said distillation is conducted continuously and said mixture is fed continuously into said column at a point adjacent a lower end thereof.

11. Method as claimed in claim 8 wherein said distillation is conducted as a batch process.

12. Method as claimed in claim 1 wherein said reaction of said PCB-rich residue with said sodium dispersion is conducted by contacting a measured batch of said PCB-rich residue isolated in a reaction vessel, at a temperature of about 120° C. to 160° C., and having a concentration of PCBs of about 15,000 to about 80,000 ppm, with a measured batch of said sodium dispersion containing at least a weight of sodium stoichiometrically required to react with the chlorine in said PCBs while vigorously agitating the reaction mixture in order to obtain an autocatalytic reaction.

13. Method as claimed in claim 12 wherein said reaction mixture contains a sodium to chlorine molar ratio of about 1.2 to about 4.

14. Method as claimed in claim 12 wherein water is added to the reaction mixture in an amount of about 2 to about 10% of the weight of sodium.

15. Method as claimed in claim 12 wherein cooling is applied to said reaction mixture in order to maintain the reaction at the said temperature.

16. Method as claimed in claim 12 wherein on completion of the reaction a compound containing reactive hydrogen is added in an amount sufficient to neutralize excess sodium in the reaction mixture.

17. Method as claimed in claim 16 wherein said compound is water.

18. Method as claimed in claim 12 including the step of obtaining said measured batch of sodium dispersion by supplying said dispersion under pressure into a closed vessel containing an inert gas and equipped with a pressure indicator until the pressure indicator indicates a predetermined pressure, interrupting the supply of said dispersion, and expelling the dispersion from the vessel under pressure of the inert gas compressed with said vessel.

19. Method as claimed in claim 18 wherein said dispersion is supplied into an upper end of said vessel.

20. The method of claim 1 and further comprising the step of:

a. collecting the PCB-rich residue prior to reacting with the dispersion of sodium particles.

21. A method for obtaining a measured batch of a sodium dispersion, comprising the steps of supplying the dispersion under pressure into a closed vessel containing an inert gas and equipped with a pressure indicator until the pressure indicator indicates a pressure corresponding to a desired quantity of sodium dispersion, interrupting the supply of the dispersion, and expelling the dispersion from the vessel under pressure exerted by the inert gas compressed within the vessel.

22. Method as claimed in claim 21 wherein the dispersion is supplied into an upper end of the vessel.

* * * * *